(12) United States Patent
Snover Burton et al.

(10) Patent No.: US 11,865,776 B2
(45) Date of Patent: Jan. 9, 2024

(54) 3D PRINTER

(71) Applicant: Rem3dy Health Limited, Birmingham (GB)

(72) Inventors: Melissa Snover Burton, Birmingham (GB); Martyn Catchpole, Birmingham (GB)

(73) Assignee: REM3DY HEALTH LIMITED, Birmingham (GB)

( * ) Notice: Subject to any disclaimer, the term of this patent is extended or adjusted under 35 U.S.C. 154(b) by 154 days.

(21) Appl. No.: 16/896,124

(22) Filed: Jun. 8, 2020

(65) Prior Publication Data

US 2020/0398483 A1 Dec. 24, 2020

(51) Int. Cl.
*B29C 64/176* (2017.01)
*B33Y 10/00* (2015.01)
(Continued)

(52) U.S. Cl.
CPC .......... *B29C 64/176* (2017.08); *B29C 64/106* (2017.08); *B29C 64/209* (2017.08); *B29C 64/241* (2017.08); *B29C 64/295* (2017.08); *B29C 64/321* (2017.08); *B33Y 10/00* (2014.12); *B33Y 30/00* (2014.12); *B33Y 80/00* (2014.12)

(58) Field of Classification Search
CPC ... B29C 64/171; B29C 64/176; B29C 64/209; B29C 64/241; B29C 64/182
See application file for complete search history.

(56) References Cited

U.S. PATENT DOCUMENTS

| 9,073,366 | B1 * | 7/2015 | Din | ........................ B41J 11/04 |
| 2015/0283751 | A1 * | 10/2015 | O'Neil | ................. B29C 64/245 |
| | | | | 425/375 |

(Continued)

FOREIGN PATENT DOCUMENTS

| CN | 105058789 A | * | 11/2015 |
| CN | 105058789 A | | 11/2015 |

(Continued)

OTHER PUBLICATIONS

GB, GB1908685.9 Combined Search and Examination Report, dated Dec. 2, 2019.
(Continued)

*Primary Examiner* — Joseph S Del Sole
*Assistant Examiner* — Ariella Machness
(74) *Attorney, Agent, or Firm* — One LLP

(57) ABSTRACT

A 3D printer for printing consumable items, the 3D printer comprising: a print head arranged to position nozzles of a plurality of liquid dispensers to define a regular polygon around a first Z axis; an actuator device operable to dispense a portion of liquid from each liquid dispenser; a print bed comprising a print zone, the print zone comprising a plurality of print locations arranged to define a regular polygon around a second Z axis; a translation device operable to move the print bed relative to the print head along X and Y axes; and a rotation device operable to cause relative rotation between the print zone and the print head such that, with the first Z axis aligned with the second Z axis, the actuator is operable to dispense liquid from each liquid dispenser onto a respective print location and thereafter the rotation device is operable to cause relative rotation between the print zone and the print head to place each print location in registration with a different one of the nozzles.

16 Claims, 8 Drawing Sheets

(51) Int. Cl.
*B33Y 30/00* (2015.01)
*B29C 64/321* (2017.01)
*B29C 64/295* (2017.01)
*B29C 64/209* (2017.01)
*B29C 64/241* (2017.01)
*B29C 64/106* (2017.01)
*B33Y 80/00* (2015.01)

(56) References Cited

U.S. PATENT DOCUMENTS

| | | | |
|---|---|---|---|
| 2017/0190118 A1* | 7/2017 | Mire | B29C 48/02 |
| 2017/0282595 A1 | 10/2017 | Moehringer et al. | |
| 2018/0007949 A1* | 1/2018 | Sung | A23P 30/25 |
| 2018/0281280 A1* | 10/2018 | Solorzano | C12N 5/0062 |
| 2019/0274348 A1* | 9/2019 | Fujimori | B29C 37/0003 |
| 2020/0238622 A1* | 7/2020 | Seo | B29C 64/393 |

FOREIGN PATENT DOCUMENTS

| | | | |
|---|---|---|---|
| CN | 105196549 A | * 12/2015 | |
| CN | 105196549 A | 12/2015 | |
| CN | 105196549 A | 7/2017 | |
| CN | 106994783 A | 8/2017 | |
| CN | 105328192 A | 9/2017 | |
| CN | 207579101 U | 7/2018 | |
| WO | WO 2004/062925 A1 | 7/2004 | |
| WO | WO-2016052228 A1 * | 4/2016 | B29C 67/00 |

OTHER PUBLICATIONS

CN, CN 202010560380.X—First Office Action issued by CNIPA, dated Jun. 8, 2022.
EP, EP 20178209.1—Extended European Search Report, dated Nov. 11, 2020.
EP, EP 20178209.1—European Search Report, dated Apr. 22, 2022.
EP, European Examination Report in EP 20178209.1, dated Jun. 27, 2023.

* cited by examiner

3D PRINTER

CROSS-REFERENCE TO RELATED APPLICATIONS

This application claims priority to European Patent Application No. 1908685.9, filed Jun. 18, 2019, which is hereby incorporated by reference in its entirety for all purposes.

BACKGROUND

Machines exist for dispensing pharmaceutical products. However, existing machines produce volumes of identical products and rely on dispensing agents, such as pharmacists, to arrange pharmaceutical products for individual consumers. A device for reducing the burden placed upon dispensing agents is therefore desirable.

SUMMARY

In accordance with a first aspect of the present invention, there is provided a 3D printer for printing consumable items, the 3D printer comprising:

a print head arranged to position nozzles of a plurality of liquid dispensers to define a regular polygon around a first Z axis;

an actuator device operable to dispense a portion of liquid from each liquid dispenser;

a print bed comprising a print zone, the print zone comprising a plurality of print locations arranged to define a regular polygon around a second Z axis;

a translation device operable to move the print bed relative to the print head along X and Y axes; and a rotation device operable to cause relative rotation between the print zone and the print head such that, with the first Z axis aligned with the second Z axis, the actuator device is operable to dispense liquid from each liquid dispenser onto a respective print location and thereafter the rotation device is operable to cause relative rotation between the print zone and the print head to place each print location in registration with a different one of the nozzles.

Thus, the 3D printer according to the first aspect of the invention is arranged to print a plurality of consumable items such as pharmaceutical or healthcare supplements in parallel. The print head positions the dispensers such that the printing axes of the dispensers are arranged in an equidistant manner around a circular path to define a regular polygon. The print bed has corresponding print locations. The translation device enables the nozzle of each dispenser to print a layer of a consumable item in a shape at a respective print location. Once a layer has been printed at each print location, the rotation device can be operated to index the print head or the print bed to place the nozzles in registration with another print location in order to build up a second layer of each consumable item on top of the first layer. This process can be repeated a number of times to quickly produce a plurality of multi-component consumable items. The dispensers can dispense quick set material liquid.

The print zone can comprise a plate and the rotation device can be mechanically coupled to the plate to rotate the plate about the second Z axis. Thus, the rotation device can be arranged to rotate the part of the print bed upon which the print head is arranged to print. This can be advantageous in that the print zone plate can be significantly lighter than the liquid dispensers and the portion of the print head which carries them, meaning that smaller, cheaper motors and the like can be utilised, bringing energy and heat efficiencies.

The translation device can be arranged to move the print bed relative to the print head along the Z axis. This enables the distance between the tips of the dispenser nozzles and the print locations on the print bed to be increased as layers of the consumable items are added, enabling the nozzles to be continually close to the top surface of a consumable item as it is built up.

Each dispenser can be a syringe arranged to be mounted in or on the print head, the print head being arranged to support the plurality of syringes. This enables ubiquitous syringes such as food or medicine grade stainless steel syringes to be used for the printing process.

The print head can comprise: a block having a plurality of block apertures extending through the block; and a syringe support arranged to receive and hold the syringes to define the regular polygon, the syringe support being removably coupled to the block.

The block can comprise heating means operable to heat the liquid in the syringes. The heat block can be used to heat the liquid in the dispensers to aid in it being extruded by the actuator device during the dispensing cycles. The block can have a thickness in the Z axis which encompasses at least half of the length of the body of the syringes to provide a large region of thermal coupling. The heating means can comprise resistive electrical wiring or hot water conduits embedded in a metal block.

The syringe support can comprise: a first support plate having a plurality of support apertures, each support aperture being arranged to receive a syringe and being sized such at least some of the body of the syringe can pass through the support aperture but a radially enlarged flange of the syringe body cannot pass through the support aperture; a second support plate having a plurality of support apertures, each support aperture being arranged to receive a syringe and being sized such at least some of the body of the syringe can pass through the support aperture but a radially enlarged flange of the syringe body cannot pass through the support aperture, the support apertures being arranged to define the regular polygon; and coupling formations arranged to enable the first support plate to be coupled to the block with the second support plate being situated between the block and the first support plate. This provides a device via which a plurality of syringes can be quickly and conveniently coupled together in the regular polygon configuration, ready for inserting into the print head.

The coupling formations can comprise regions of ferromagnetic material and the block comprises a plurality of electromagnets situated to align with the coupling regions when the syringe support is situated on the block and operable to magnetically couple the syringe support to the block. The coupling formations can comprise discs which extend from a lower face of the first plate by a distance which places the free axial faces of the discs in registration with the lower surface of the second plate when the plates are pressed together with the syringe flanges between them.

The actuator device can comprise: a drive plate having a drive face with plurality of syringe plunger locations arranged in the regular polygon and a pair of parallel support rails defining a channel between them and having flanged sections spaced from the first plate and extending towards one another, the plurality of syringe plunger locations being defined between the support rails; first and second retention plates, each retention plate including a plurality of retention slots that extend into the retention plate from a first edge and have arcuate end faces which, when the first and second retention plates are inserted into opposite end of the channel, with the syringe plungers located at the syringe plunger locations, overlap the syringe plungers to grasp the syringe plungers; and one or more linear actuators coupled between the drive plate and the block to linearly move the drive plate towards the block to dispense liquid from the syringes. This provides a device via which a plurality of syringes located in a syringe support can be quickly and conveniently coupled to the print head.

The print bed can comprise a plurality of print zones. Thus, the translation device can be utilised to move the print bed along the X axis once a first set of consumable items have been printed at the first print zone and the process can be repeated to print one or more further sets of consumable items at one or more further print zones on the print bed. This can enable a greater number of consumable items to be printed in a fast manner without increasing the size, weight and/or complexity of the print head.

The print head can be arranged to position the nozzles to define a seven sided polygon and each print zone positions the print locations to define a seven sided polygon. The print bed can consists of four print zones disposed in a linear arrangement along the print bed, with the axis of each print zone intersecting a longitudinal axis of the print bed. This can provide an arrangement particularly well suited to printing pharmaceutical or healthcare supplements.

The 3D printer can further comprise a controller configured to cause the 3D printer to perform the following steps: with the first Z axis aligned with the second Z axis, operate the actuator device to dispense liquid from each nozzle onto a respective print location: operate the rotation device to cause relative rotation between the print zone and the print head to place each print location in registration with a different one of the nozzles; and operate the actuator device to dispense liquid from each nozzle onto a respective print location. This process can be repeated a number of times, preferably by the same number as the number of dispensers such that a multi-layer consumable item can be printed having a component provided by each dispenser.

The controller can be further configured to cause the 3D printer to perform the following steps: move the print bed in the Z direction away from the print head following each step of operating the actuator device to dispense liquid from each liquid dispenser onto a respective print location by an amount which corresponds to the thickness in the Z axis of the liquid dispensed on the print locations.

The controller can be further configured to move the print bed in the X and Y directions while operating the actuator device to dispense liquid from each liquid dispenser onto a respective print location to define a closed loop shape.

In accordance with a second aspect of the invention, there is provided a method of contemporaneously producing a plurality of consumable items using the 3D printer according to any preceding claim, the method comprising: with the first Z axis aligned with the second Z axis, operating the actuator device to dispense liquid from each nozzle onto a respective print location: operating the rotation device to cause relative rotation between the print zone and the print head to place each print location in registration with a different one of the nozzles; and operating the actuator device to dispense liquid from each nozzle onto a respective print location.

The liquid dispensers may be filled with any of the compositions disclosed in WO 2016113318 A1, WO 201121822 A1 or WO 2017/032689 A1. The liquid dispensers may be filled with a fast-setting composition, optionally a fast-setting gel. This can allow faster rates of manufacture.

BRIEF DESCRIPTION OF THE DRAWINGS

By way of example only, certain embodiments of the invention will now be described by reference to the accompanying drawings, in which.

DETAILED DESCRIPTION

Figure 1A:
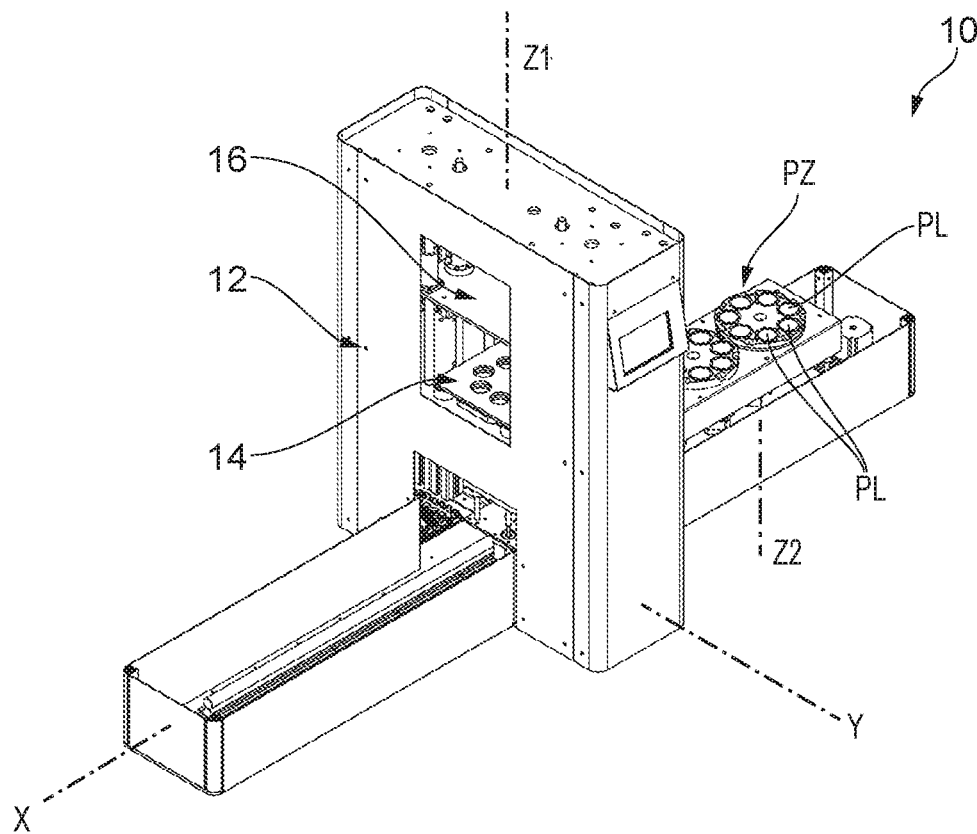
FIGS. 1a and 1b are perspective and side view diagrams of a 3D printer according to an embodiment of the invention.
Figure 1B:
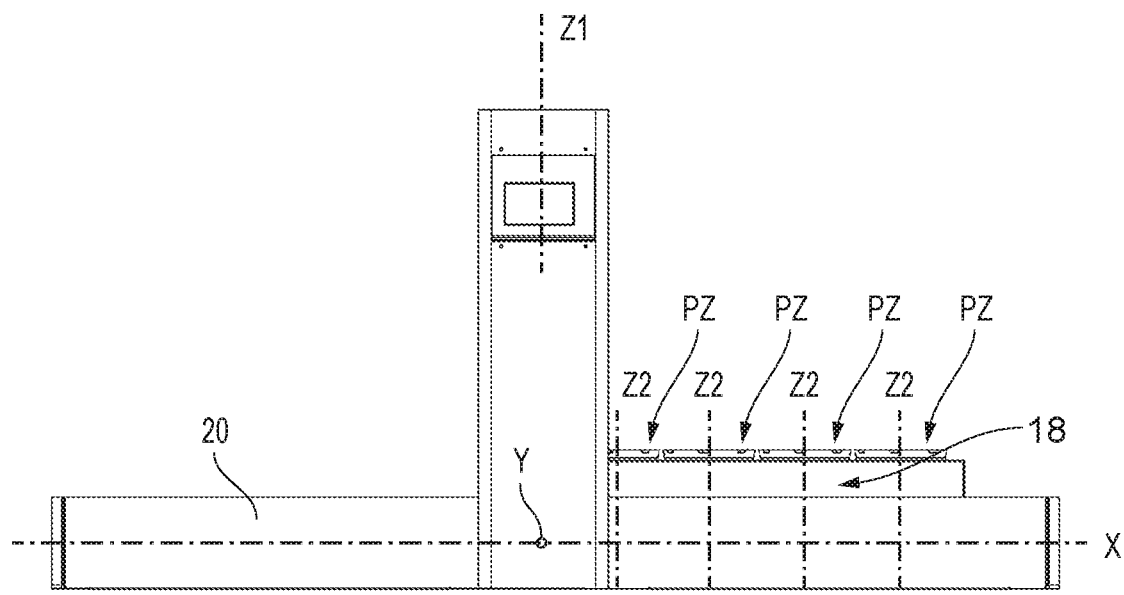

FIGS. 1a and 1b show a 3D printer for printing consumable items according to an embodiment of the invention generally at 10. The 3D printer 10 is arranged to print a plurality of consumable items such as pharmaceutical or healthcare supplements in parallel.

The 3D printer 10 has a print head 12 arranged to position nozzles of a plurality of liquid dispensers to define a regular polygon around a first Z axis Z1. In this embodiment the fluid dispensers are syringes arranged to be situated in a downward facing manner on a block 14 within the print head 12.

The 3D printer 10 has an actuator device 16, which in this embodiment is located within the print head 12, operable to dispense a portion of liquid from each liquid dispenser located within the block 14.

The 3D printer 10 has a print bed comprising four print zones PZ, each print zone PZ comprising a plurality of print locations PL arranged to define a regular polygon around a respective second Z axis Z2.

The 3D printer 10 has a translation device operable to move the print bed 18 relative to the print head 12 along X and Y axes. In this embodiment the print bed 18 is slidably mounted on a base 20 so as to be movable along the X axis.

As can be seen from FIGS. 1a and 1b, the first and second Z axes Z1, Z2 are vertical and may be offset and the X and Y axes are horizontal and may be perpendicular to each other.

The 3D printer 10 has a rotation device operable to cause relative rotation between the print zone PZ and the print head 12 such that, with the first Z axis Z1 aligned with the second Z axis Z2, the actuator device 16 is operable to dispense liquid from each liquid dispenser onto a respective print location PL and thereafter the rotation device is operable to cause relative rotation between the print zone PZ and the print head 12 to place each print location PL in registration with a different one of the nozzles.

Figure 2A:
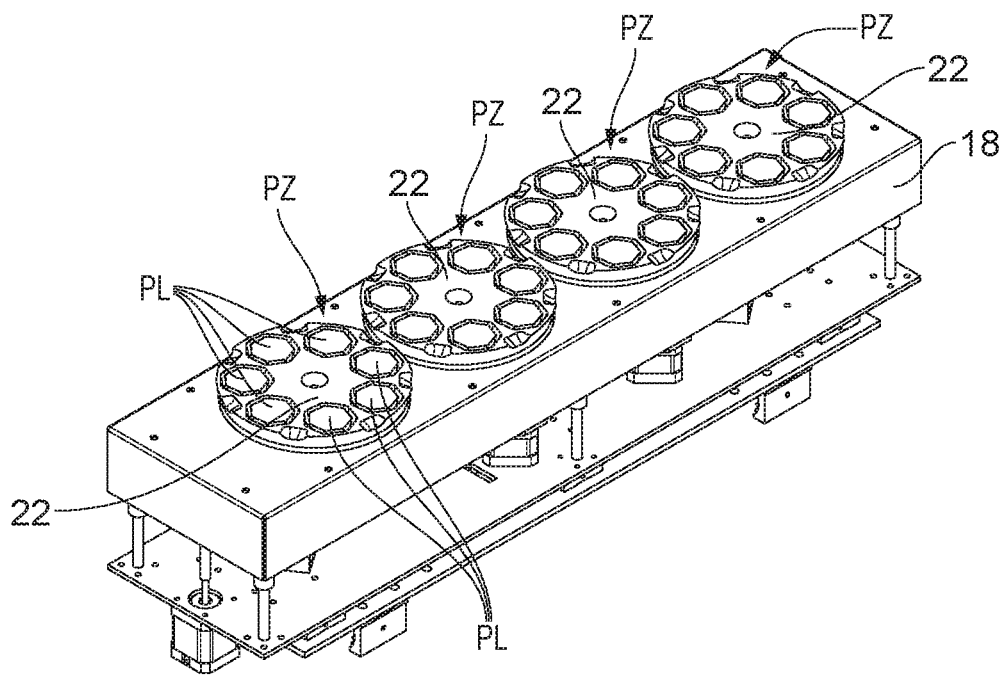
FIGS. 2a, 2b and 2c are perspective, top and side view diagrams respectively of a movable portion of the print bed of the 3D printer of FIG. 1.
Figure 2B:
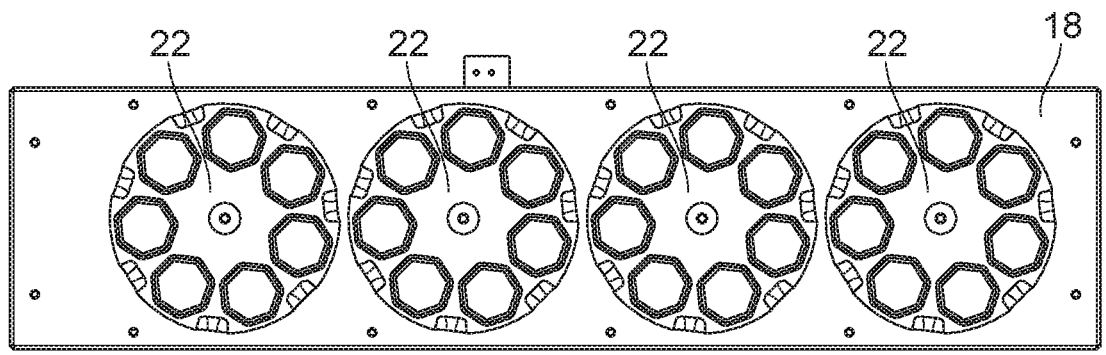
Figure 2C:
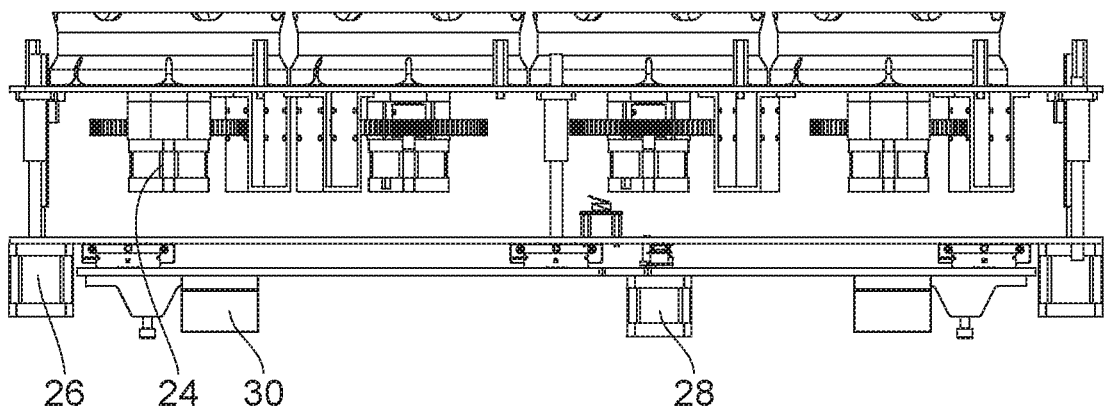

FIGS. 2a, 2b and 2c are perspective, top and side view diagrams respectively of the movable portion of the print bed 18 of the 3D printer of FIG. 1.

The print bed 18 is supported on a base 20, the base having an X motor (not shown) for moving the print bed 18 in the X direction by interaction with an X bearing 30. The print bed has a Z motor 26 for moving the print bed 18 in a vertical direction, i.e. along the second Z axis Z2 and a Y motor 28 for moving the print bed 18 along the Y axis.

The print bed 18 comprises plates 22, which form print zones PZ. In the disclosed embodiment, there are four plates 22 forming four respective print zones PZ, however other numbers of plates 22 and print zones PZ may be used. The print zones PZ may be located along a top surface of the print bed 18 and separated along the X axis.

The respective print zone PZ defined by each plate 22 has a plurality of print locations PL. The plates 22 may each be rotationally symmetrical about their respective second Z axis Z2 such that the plates 22 can be rotated and the print locations can change position such that a first print location PL may take the position of a second print location PL when the plate 22 is rotated by a predetermined number of degrees. The plates 22 can be rotated in order to move the print locations PL by rotation motors 24. The rotation motors 24 are preferably stepper motors, which can provide a high degree of accuracy of rotation.

While FIGS. 2*a* and 2*b* show print zones PZ each having seven print locations PL, other numbers of print locations PL on each print zone are possible. The number of print locations PL in each print zone PZ should preferably be the same as the number of syringes supported within the print head 12.

Figure 3:
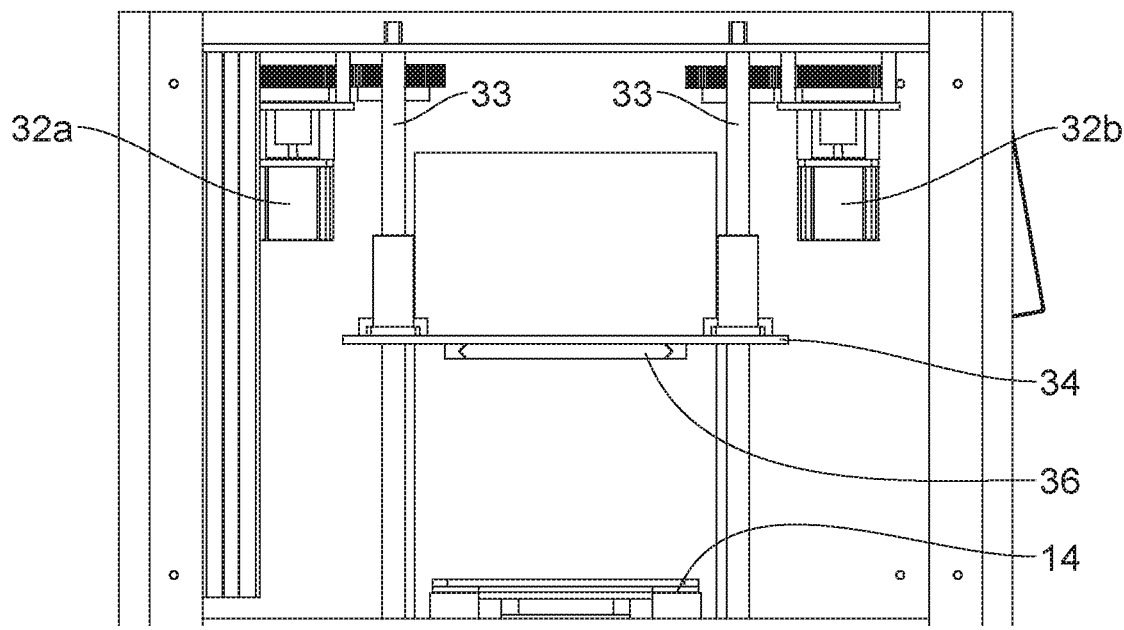
FIG. 3 is a side view diagram showing internal components of the print head of the 3D printer of FIG. 1.

FIG. 3 shows an extrusion system for operating syringes. The extrusion system comprises an extrusion plate 34 for pressing on the plungers of syringes and a stabilising plate 36 for securing the plungers of syringes. The extrusion plate 34 and the stabilising plate 36 are moveable in a vertical direction along rails 33, which define a channel therebetween. Extrusion motors 32*a* and 32*b* are arranged to drive the extrusion plate 34 and stabilising plate 36 vertically in order to exert a downward force on the plungers of the syringes such that material is dispensed from the syringes.

The system may also comprise a heater block 14, which may contain an electrical wire or fluid circulation system and is arranged to heat material within the syringes in order to reduce the viscosity of the material and/or melt the material in order that the material can be more easily dispensed from the syringes and a greater range of materials may be dispensed by using a heater block 14.

Figures 4A, 4B:
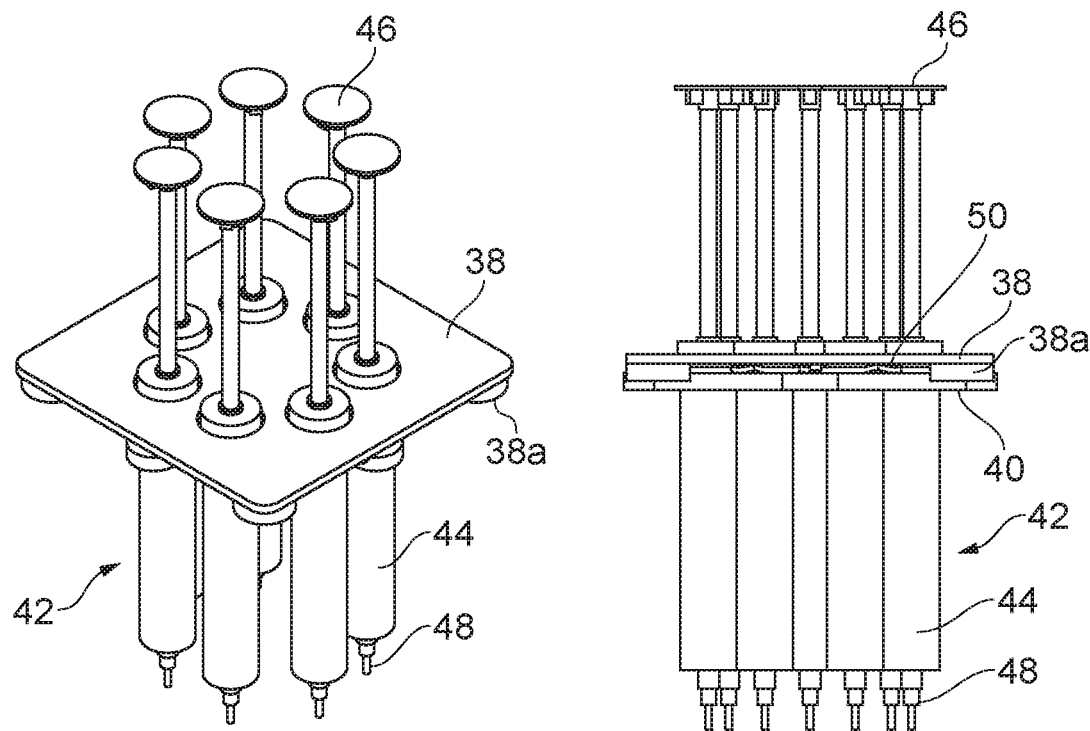
FIGS. 4a and 4b are perspective and side view diagrams respectively of syringes held in a syringe support of the 3D printer of FIG. 1.

FIGS. 4*a* and 4*b* show an arrangement of syringes 42. Each syringe has a syringe body 44, which may be filled with an esculent material to be dispensed, a nozzle 48 for controlling dispensation of the material, and a plunger 46, which can be pressed towards the syringe body 44 in order to extrude material from the nozzle 48. Each syringe may also have a lug 50 extending from the syringe body 44. The lug 50 can be placed between two support plates 38, 40. There may be a first support plate 38 above the lug and a second support plate 40 below the lug. The first support plate 38 may have coupling formations 38*a* for holding the first support plate 38 to a block, such as heating block 14 of the print head 12 or a non-heated block.

The arrangement of the first and second support plates 38, 40 and the syringes 42 allows the syringes 42 to be held in a stable formation outside the print head 12 so that the syringes 42 can all be inserted quickly and easily at the same time into the print head 12.

Figure 5:
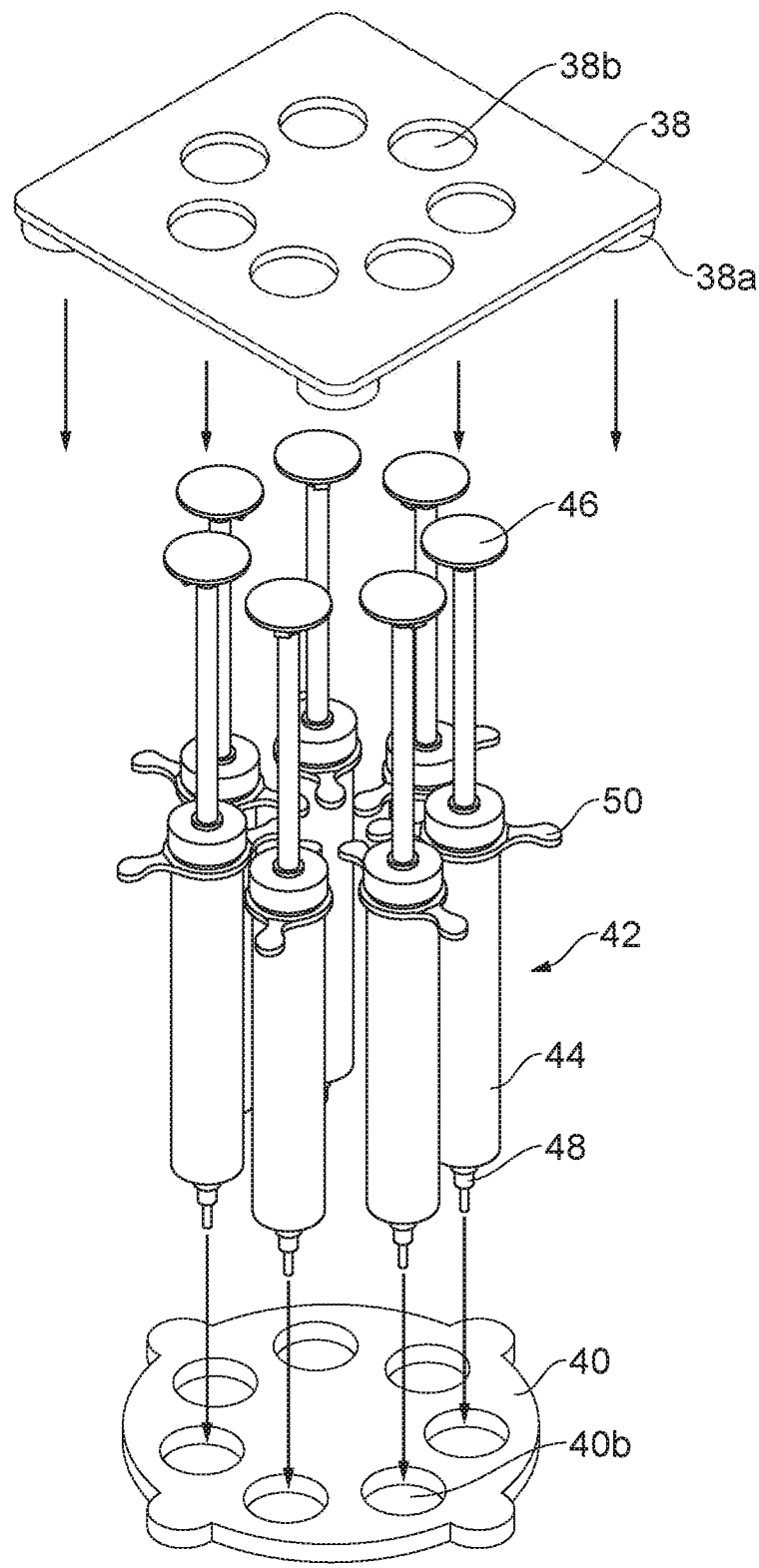
FIG. 5 is a diagram illustrating syringes being loaded into the syringe support of the 3D printer of FIG. 1.

As shown in FIG. 5, the first support plate 38 may have support apertures 38*b* sized to be larger than the syringe body 44 and smaller than the lugs 50 and the second support plate 40 may have second support apertures 40*b*, which may also be sized to be larger than the syringe body 44 and smaller than the lugs 50. This allows the syringes 42 to be inserted through the support apertures 38*b*, 40*b* and held in place by the lugs 50 and support plates 38, 40.

Figure 6:
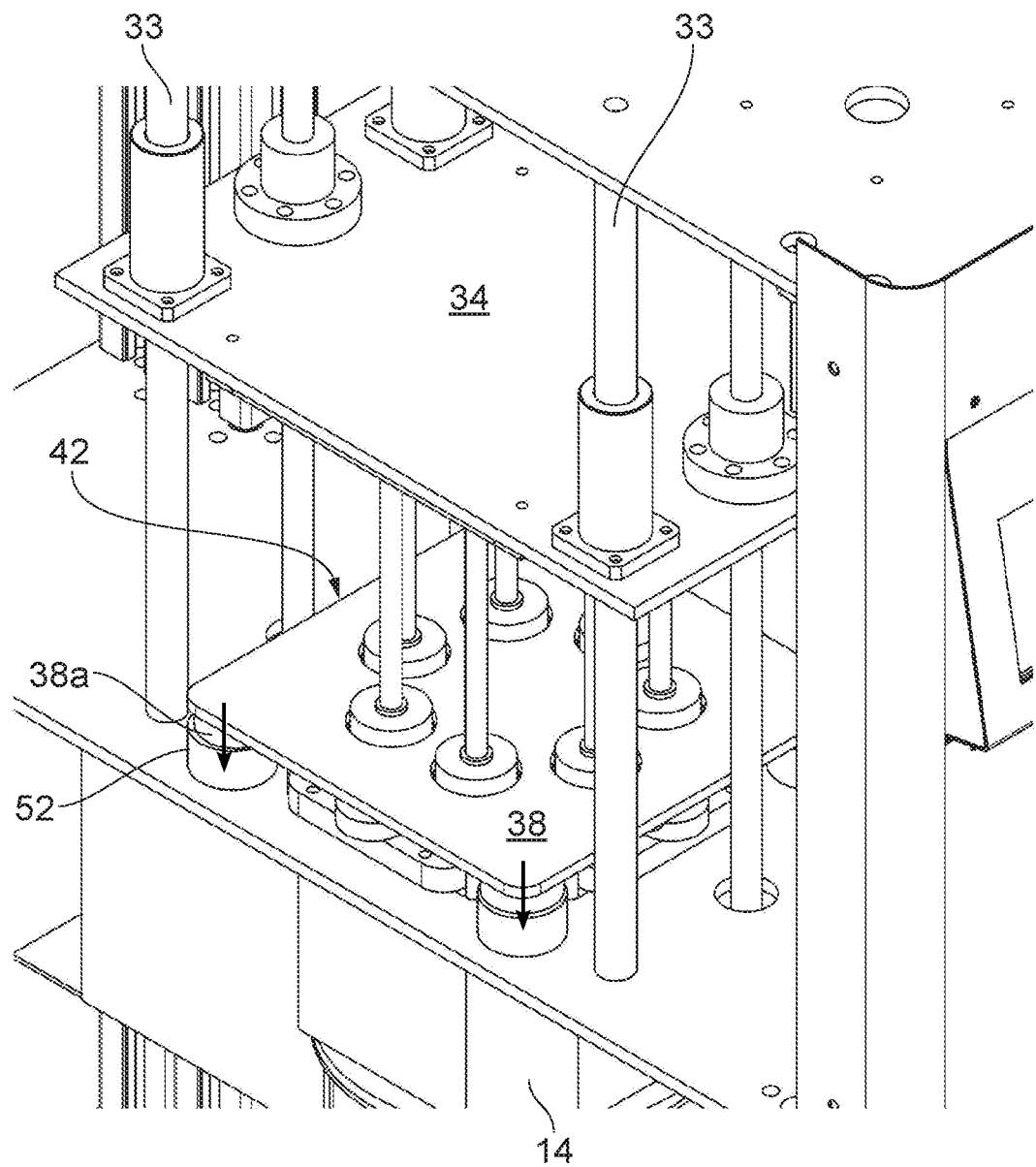
FIG. 6 is a diagram showing the syringe support mounted on the block of the print head of the 3D printer of FIG. 1.

FIG. 6 shows the print head 12 with the syringes 42 installed. The syringes 42 are installed within the heating block 14 and are held in place by the first support plate 38 and second support plate (not visible in FIG. 6). It can be seen that the coupling formations 38*a* are coupled to corresponding coupling formations 52 on the heating block 14. The coupling formations 38*a* on the first support place 38 may be ferromagnetic materials and the corresponding coupling formations 52 on the heater block 14 may be magnets, preferably electromagnets. The plunger ends of the syringes 42 (not visible in FIG. 6) are situated under the extrusion plate 34, such that the extrusion plate 34 may move vertically downwards in order to extrude material from the syringes 42.

Figure 7:
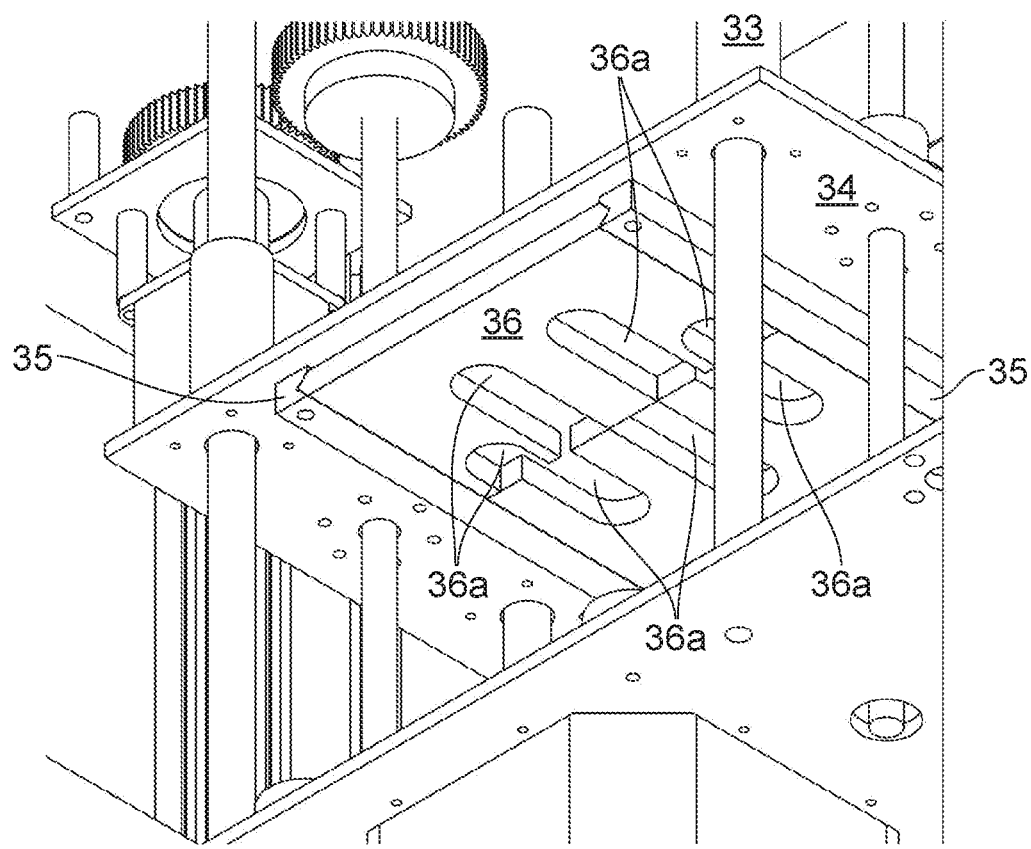
FIG. 7 is a perspective diagram of a lower side of the drive plate of the actuator device of the 3D printer of FIG. 1.

FIG. 7 shows a view of the stabilising plate 36 connected to the extrusion plate 34 from underneath. It can be seen that the stabilising plate 36 may be formed as two parts, which may be slid into place along slide rails 35. The stabilising plates 36 may comprise stabilisation slots 36*a* which may be slid into place in order to hold the plungers 46 of the syringes 42.

Figure 8:
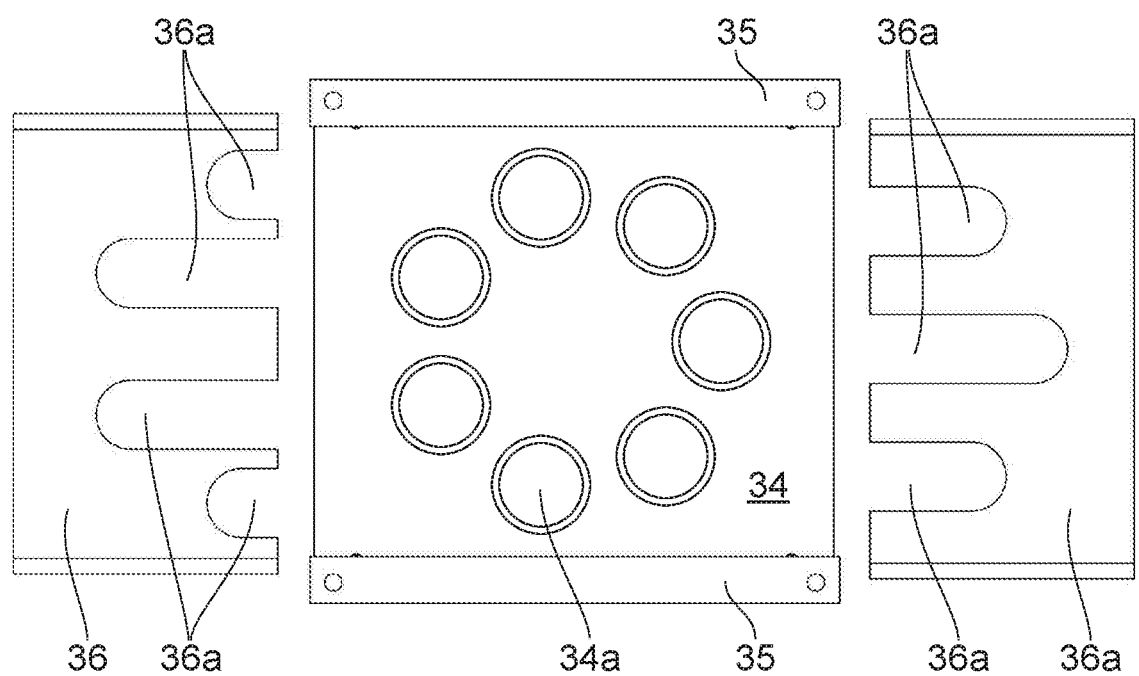
FIG. 8 is a lower view of part of the drive plate, showing plunger locations.
Figure 9:
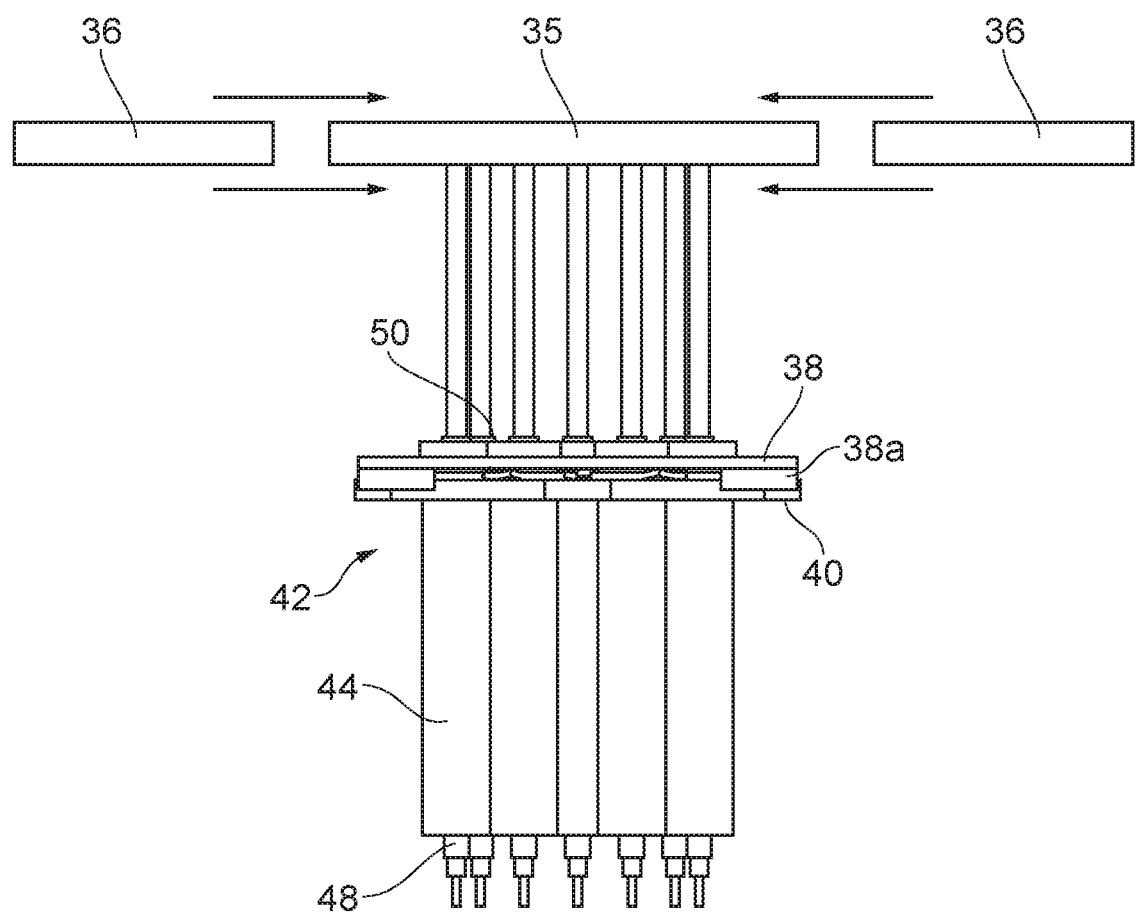
FIG. 9 is a side view diagram illustrating insertion of the retention plates.

FIGS. 8 and 9 show how the two parts of the stabilising plate 36 may be slid into place.

The machine may be operated such that the extrusion plate 34 is operated to push down on the syringes 42 so that all plungers are touching the extruding plate 34 and the stabilising plates 36 may be slid into place to grip onto the plungers 46 while the plungers 46 are all in contact with the extrusion plate 38. This can prevent the plungers 36 from moving away from the extrusion plate 38 and ensure stabilisation of the plungers 42.

The 3D printer may be operated so that a print zone PZ is positioned underneath the syringes 42, with the first Z axis Z1 collinear with the second Z axis Z2 and the print zone PZ underneath the plungers 42. An amount of material may be extruded from the nozzles 48 of the syringes 42 onto the plurality of print locations PL underneath the syringes 42. Following the extrusion of material, the extrusion may be stopped and the print location can be changed by rotating the plate 22 about the Z axis Z2. The rotation can occur such that after the rotation each print location PL is underneath a different syringe 42. Subsequently, a second extrusion step can take place, wherein further material is extruded from each syringe 42 onto a respective print location PL, with each print location PL having a different material from a different syringe 42 deposited onto it between each rotation step. This process can be repeated until every print location PL has all necessary material deposited upon it, such as after a complete rotation of the print zone PZ. Subsequently, the print bed 18 can be moved in the X direction such that a new print zone PZ and is positioned underneath the syringes 42.

It is also noted that certain syringes 42 of the arrangement may be absent or may be empty, if the number of different materials required to be deposited does not exactly match the number of print locations PL. Alternatively, more than one syringe 42 may contain the same material, it is not essential that every syringe 42 has a different material.

The syringes 42 may be sterile syringes suitable for use in food or pharmaceutical manufacture and may be filled with pharmaceutical or food compositions for manufacturing food or pharmaceutical supplements, including vitamin and mineral supplements. The composition may be solid or may be a gel at room temperature, and may become liquid or a less viscous gel when heated by the heated block 14.

It is also possible to move the print bed 18 and therefore the print zone PZ and print location PL in the X and Y directions during the extrusion step in order to control the manner and precise location of deposition of material on each print location.

In between each extrusion step, the print bed 18 can be moved in the Z direction, for example in order to prevent deposited material from touching a syringe novel nozzle 48.

Figure 10:
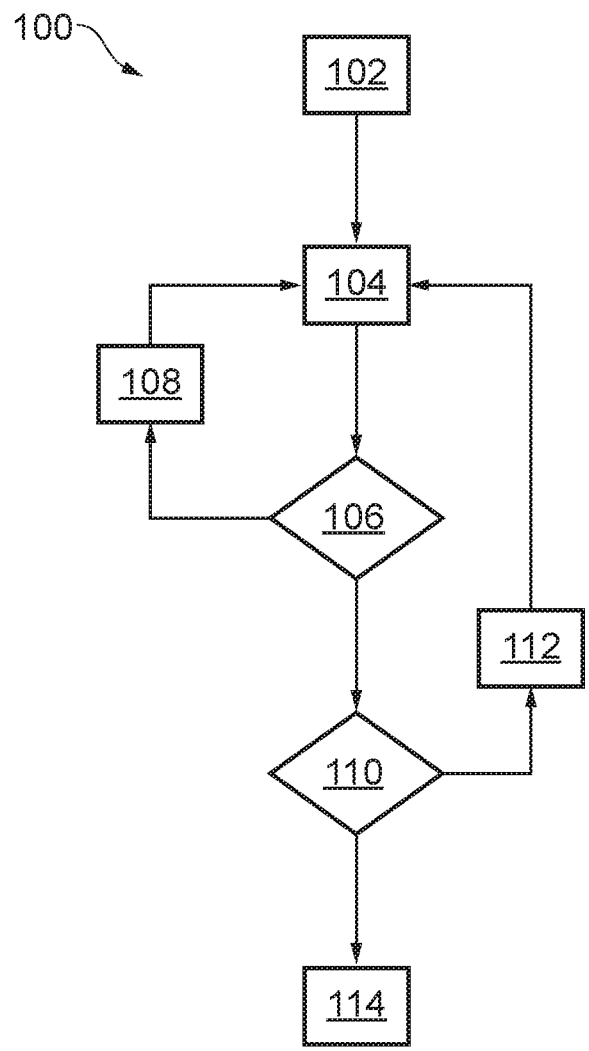
FIG. 10 is a flow chart illustrating a method according to an embodiment of the invention.

The flowchart in FIG. 10 illustrates a method 100 by which the print head 12 may operate.

At step 102, the print head 12 is primed, with the syringes 42 inserted and a print zone PZ situated underneath the syringes 42. This may include the print zone PZ being moved into position along the X-axis and may include an alignment check to ensure that each print location PL is aligned with a nozzle 44 of a particular syringe 42.

At step 104, material is deposited from the syringes 42 onto the respective print locations PL by movement of the extrusion plate 38.

At step 106, a check is made as to whether every print location PL within the print zone PZ under the syringes 42 has the required materials deposited upon it. If every print location PL has all of the required materials, then the method moves to step 110, otherwise the method moves to step 108.

At step 108, the print zone PZ is rotated so that each print location PL aligns with a different syringe 42 so that a different material can be deposited onto each print location PL. A further deposition step 104 can then take place.

At step 110, it is determined whether every print zone PZ on the print bed has had materials deposited upon it, or whether there are more print zones PZ that require printing. If all print zones PZ have been printed, then the method finishes at step 114. Otherwise, the method moves to step 112.

At step 112, the print bed is moved in the X direction so that a new print zone PZ is aligned with the syringes 42. This may also include an alignment check to ensure that each print location PL is underneath a syringe 42. Subsequently, a further deposition of material occurs at step 104.

At step 114 the method is finished and the printed products can be removed. At this stage a volume of customised esculent products have been produced.

It should be noted that the above-mentioned embodiments illustrate rather than limit the invention, and that those skilled in the art will be capable of designing many alternative embodiments without departing from the scope of the invention as defined by the appended claims.

The invention claimed is:

1. A 3D printer for printing consumable items, the 3D printer comprising:
   a print head arranged to position nozzles of a plurality of liquid dispensers to define a regular polygon around a first Z axis;
   an actuator device operable to dispense a portion of liquid from each liquid dispenser;
   a print bed comprising a print zone, the print zone comprising a plurality of print locations arranged to define a regular polygon around a second Z axis;
   a translation device operable to move the print bed relative to the print head along X and Y axes;
   a rotation device operable to cause relative rotation between the print zone and the print head such that, with the first Z axis aligned with the second Z axis, the actuator is operable to dispense liquid from each liquid dispenser onto each of the print locations and thereafter the rotation device is operable to cause relative rotation between the print zone and the print head to place each respective one of the print locations in registration with a different one of the nozzles; and
   a controller configured to cause the 3D printer to produce a different one of multi-layered consumable items on each print location, at least in part by performing the following steps:
   with the first Z axis aligned with the second Z axis, operate the actuator device to dispense, in a first dispensing, liquid simultaneously from each of the liquid dispensers onto each of the print locations, wherein each of the liquid dispensers dispenses onto a different one of the print locations;
   operate the rotation device to cause relative rotation between the print zone and the print head and place each of the print locations in registration with a different one of the nozzles than during the first dispensing; and
   operate the actuator device after the relative rotation to dispense, in a second dispensing, liquid from each of the liquid dispensers simultaneously onto each of the print locations, wherein each of the liquid dispensers dispenses onto a second one of the print locations different from a first one of the locations onto which each of the liquid dispensers dispensed during the first dispensing.

2. The 3D printer according to claim 1, wherein the print zone comprises a plate and the rotation device is mechanically coupled to the plate to rotate the plate about the second Z axis.

3. The 3D printer according to claim 1, wherein the translation device is operable to move the print bed relative to the print head along the Z axis.

4. The 3D printer according to claim 1, wherein each dispenser is a syringe and the print head is arranged to support the plurality of syringes.

5. The 3D printer according to claim 4, wherein the print head comprises:
   a block having a plurality of block apertures extending through the block;
   and a syringe support arranged to receive and hold the syringes to define the regular polygon, the syringe support being removably coupled to the block.

6. The 3D printer according to claim 5, wherein the block comprises heating means operable to heat the liquid in the syringes.

7. The 3D printer according to claim 5, wherein the syringe support comprises:
   a first support plate having a plurality of support apertures, each support aperture being arranged to receive a syringe and being sized such that at least some of the body of the syringe can pass through the support aperture but a radially enlarged flange of the syringe body cannot pass through the support aperture;
   a second support plate having a plurality of support apertures, each support aperture being arranged to receive a syringe and being sized such at least some of the body of the syringe can pass through the support aperture but a radially enlarged flange of the syringe body cannot pass through the support aperture,
   the support apertures being arranged to define the regular polygon; and
   coupling formations arranged to enable the first support plate to be coupled to the block with the second support plate being situated between the block and the first support plate.

8. The 3D printer according to claim 7, wherein the coupling formations comprise regions of ferromagnetic material and the block comprises a plurality of electromagnets situated to align with the coupling regions when the syringe support is situated on the block and operable to magnetically couple the syringe support to the block.

9. The 3D printer according to claim 7, wherein the actuator device comprises:
  a drive plate having a drive face with plurality of syringe plunger locations arranged in the regular polygon and a pair of parallel support rails defining a channel between them and having flanged sections spaced from the first support plate and extending towards one another, the plurality of syringe plunger locations being defined between the support rails;
  first and second retention plates, each retention plate including a plurality of retention slots that extend into the retention plate from a first edge and have arcuate end faces which, when the first and second retention plates are inserted into opposite ends of the channel, with the syringe plungers located at the syringe plunger locations, overlap the syringe plungers to grasp the syringe plungers; and
  one or more linear actuators coupled between the drive plate and the block to linearly move the drive plate towards the block to dispense liquid from the syringes.

10. The 3D printer according to claim 1, wherein the print bed comprises a plurality of print zones.

11. The 3D printer according to claim 10, wherein the print head is arranged to position the nozzles to define a seven sided polygon and each print zone positions the print locations to define a seven sided polygon.

12. The 3D printer according to claim 10, wherein the print bed consists of four print zones disposed in a linear arrangement along the print bed, optionally wherein the axis of each print zone intersecting a longitudinal axis of the print bed.

13. The 3D printer according to claim 1, wherein the controller is further configured to cause the 3D printer to perform the following steps:
  move the print bed in the Z direction away from the print head following each step of operating the actuator device to dispense liquid from each liquid dispenser onto respective one of the print locations by an amount which corresponds to the thickness in the Z axis of the liquid dispensed on the print locations; and/or
  move the print bed in the X and Y directions while operating the actuator device to dispense liquid from each liquid dispenser onto the respective ones of the print locations to define a closed loop shape.

14. A method of contemporaneously producing a plurality of consumable items using the 3D printer according to claim 1, the method comprising:
  with the first Z axis aligned with the second Z axis, operating the actuator device to dispense, in a first dispensing, liquid simultaneously from each of the liquid dispensers onto each of the print locations, wherein each of the liquid dispensers dispenses onto a different one of the print locations;
  operating the rotation device to cause relative rotation between the print zone and the print head and place each of the print locations in registration with a different one of the nozzles than during the first dispensing; and
  operating the actuator device after the relative rotation to dispense, in a second dispensing, liquid from each of the liquid dispensers simultaneously onto each of the print locations, wherein each of the liquid dispensers dispenses onto a second one of the print locations different from a first one of the locations onto which each of the liquid dispensers dispensed during the first dispensing.

15. The 3D printer of claim 1, wherein each of the consumable items comprises a liquid from a different liquid dispenser in each layer.

16. A 3D printer for printing consumable items, the 3D printer comprising:
  a print head arranged to position nozzles of a plurality of liquid dispensers to define a regular polygon around a first Z axis;
  an actuator device operable to dispense a portion of liquid from each liquid dispenser wherein the actuator device comprises
    a drive plate having a drive face with plurality of syringe plunger locations arranged in the regular polygon and a pair of parallel support rails defining a channel between them and having flanged sections spaced from the first support plate and extending towards one another, the plurality of syringe plunger locations being defined between the support rails,
    first and second retention plates, each retention plate including a plurality of retention slots that extend into the retention plate from a first edge and have arcuate end faces which, when the first and second retention plates are inserted into opposite ends of the channel, with the syringe plungers located at the syringe plunger locations, overlap the syringe plungers to grasp the syringe plungers, and
    one or more linear actuators coupled between the drive plate and the block to linearly move the drive plate towards the block to dispense liquid from the syringes;
  a print bed comprising a print zone, the print zone comprising a plurality of print locations arranged to define a regular polygon around a second Z axis;
  a translation device operable to move the print bed relative to the print head along X and Y axes; and
  a rotation device operable to cause relative rotation between the print zone and the print head such that, with the first Z axis aligned with the second Z axis, the actuator is operable to dispense liquid from each liquid dispenser simultaneously onto each of the print locations and thereafter the rotation device is operable to cause relative rotation between the print zone and the print head to place each respective one of the print locations in registration with a different one of the nozzles.

* * * * *